(12) United States Patent
Ooba

(10) Patent No.: US 10,252,416 B2
(45) Date of Patent: Apr. 9, 2019

(54) ARTICLE CONVEYING DEVICE HAVING TEMPORARY PLACEMENT SECTION

(71) Applicant: FANUC Corporation, Minamitsuru-gun, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/631,020

(22) Filed: Jun. 23, 2017

(65) Prior Publication Data

US 2018/0001469 A1 Jan. 4, 2018

(30) Foreign Application Priority Data

Jun. 29, 2016 (JP) .................... 2016-129050

(51) Int. Cl.
*B65G 47/90* (2006.01)
*B25J 9/00* (2006.01)
(Continued)

(52) U.S. Cl.
CPC ............ *B25J 9/0093* (2013.01); *B25J 9/1697* (2013.01); *B65G 47/30* (2013.01); *B65G 47/90* (2013.01); *B65G 47/905* (2013.01); *G05B 19/4182* (2013.01); *B65G 2203/0233* (2013.01); *B65G 2203/041* (2013.01); *G05B 2219/39102* (2013.01); *G05B 2219/40007* (2013.01); *Y02P 90/02* (2015.11)

(58) Field of Classification Search
CPC ............... B65G 47/90; B25J 9/0093
See application file for complete search history.

(56) References Cited

U.S. PATENT DOCUMENTS 5,503,516 A * 4/1996 Kasai .................... B23P 19/001
221/134
9,346,630 B2 5/2016 Nishizake et al.
(Continued)

FOREIGN PATENT DOCUMENTS

DE 10300606 A1 7/2004
DE 102009000062 A1 6/2011
(Continued)

*Primary Examiner* — Thomas Randazzo
(74) *Attorney, Agent, or Firm* — RatnerPrestia

(57) ABSTRACT

An article conveying device having a temporary placement section and capable of conveying articles. The article conveying device has: a supplying section configured to sequentially convey or supply plural articles; a discharging section configured to sequentially convey plural containers for containing the articles; a temporary placement section on which at least one article can be temporarily placed; a first detecting section configured to detect a position/posture of the article on the supplying section and successively detect an amount of movement of the supplying section; a second detecting section configured to detect a position/posture of the container on the discharging section and successively detect an amount of movement of the discharging section; a working machine configured to convey the article between the supplying section, the temporary placement section and the discharging section; and a controlling section configured to control the working machine based on a predetermined condition.

7 Claims, 6 Drawing Sheets

(51) Int. Cl.
*B25J 9/16* (2006.01)
*B65G 47/30* (2006.01)
*G05B 19/418* (2006.01)

(56) References Cited

U.S. PATENT DOCUMENTS

| | | |
|---|---|---|
| 9,604,365 B2 | 3/2017 | Kanno et al. |
| 2004/0193319 A1 | 9/2004 | Gross et al. |
| 2010/0305754 A1* | 12/2010 | Ban ................. B25J 9/0093 700/248 |
| 2011/0170998 A1* | 7/2011 | Winkler ............. B65G 1/1376 414/564 |
| 2011/0182709 A1 | 7/2011 | Weber |
| 2012/0165972 A1 | 6/2012 | Wappling et al. |
| 2016/0151916 A1* | 6/2016 | Kanno ................ B25J 9/1697 700/228 |

FOREIGN PATENT DOCUMENTS

| | | | | |
|---|---|---|---|---|
| EP | 1769891 B1 | | 10/2014 | |
| JP | 2010-280010 A | | 12/2010 | |
| JP | 2011140084 A | | 7/2011 | |
| JP | 2012184102 A | * | 9/2012 | ............ B65G 47/90 |
| JP | 2012-188231 A | | 10/2012 | |
| JP | 2016107349 A | | 6/2016 | |
| JP | 2017056528 A | * | 3/2017 | ............ B25J 13/08 |
| JP | 2017056528 A | | 3/2017 | |

* cited by examiner

ARTICLE CONVEYING DEVICE HAVING TEMPORARY PLACEMENT SECTION

BACKGROUND OF THE INVENTION

1. Field of the Invention

The present invention relates to an article conveying device configured to temporarily place an article to be conveyed and convey the article.

2. Description of the Related Art

A conveying system, in which a container capable of containing an article is conveyed by a conveyor, and the article is contained into the container by using a robot, is well known. For example, JP 2010-280010 A discloses an article conveying device configured to detect as to whether or not an article is contained in each cell of a container by using a camera, and carry out containing operation based on a result of the detection.

On the other hand, a system provided with a temporary placement section in order to avoid that an article supplied by a conveyor is disadvantageously discharged from the system, is well known. For example, JP 2012-188231 A discloses an apparatus for supplying and stacking a commercial product, including: a supply conveyor for supplying a commercial product; a stacking conveyor for conveying a predetermined number of stacked commercial products; a parallel robot for moving the commercial product from the supply conveyor to the stacking conveyor; and a temporary placement table for temporarily placing the commercial product taken out from the supply conveyor.

In JP 2010-280010 A, a plurality of robots are used to effectively contain the article into the container. On the other hand, although JP 2012-188231 A discloses a system including one parallel robot and a temporary placement table, there is no particular criterion for judging as to whether the article should be placed on the temporary placement table. Therefore, when a large number of articles are supplied, the temporary placement table may be overflowing with the articles.

Further, as described in JP 2010-280010 A, when an article and a container for containing the article are respectively conveyed by different conveyors, two cases (i.e., one case in which the articles are excessively supplied relative to a capacity of the container, and the other case in which the articles are insufficiently supplied relative to the capacity of the container) may occur. However, in the prior art, a technique for efficiently utilizing the temporary placement table in both the two cases has not been proposed.

SUMMARY OF THE INVENTION

Accordingly, an object of the present invention is to provide an article conveying device capable of automatically judging as to whether or not an article should be temporarily placed, and continuously conveying a generally constant amount of articles.

Therefore, one aspect of the present invention provides an article conveying device comprising: a supplying section configured to convey a plurality of articles; a discharging section configured to convey a plurality of containers each having a plurality of cells for containing the plurality of articles; a temporary placement section having a temporary placement space on which at least one of the articles can be temporarily placed; a first detecting section configured to detect a position and posture of the article on the supplying section at a first time point, and detect an amount of movement of the supplying section; a second detecting section configured to detect a position and posture of the container on the discharging section at a second time point, and detect an amount of movement of the discharging section; a working machine configured to: take out the article by following the movement of the article on the supplying section, based on the position and posture of the article at the first time point and the amount of movement of the supplying section; place the taken out article on the temporary placement section; take out the article placed on the temporary placement section; and locate the article into the container by following the movement of the container on the discharging section, based on the position and posture of the container at the second time point and the amount of movement of the discharging section; and a controlling section configured to, when the article is positioned within an article existence judgment region defined on the supplying section and when a predicted arrival time or distance until the container conveyed by the discharging section reaches a motion range of the working machine is larger than a predetermined value, command the working machine to place the article from the supplying section to the temporary placement section, and command the working machine to locate the article from the temporary placement section into the container which has reached the motion range.

In this aspect, a start point and an end point of the article existence judgment region may be set at respective positions which are separated from the motion range of the working machine on the supplying section by respective predetermined distances in an upstream direction.

Another aspect of the present invention provides an article conveying device comprising: a supplying section configured to convey a plurality of articles; a discharging section configured to convey a plurality of containers each having a plurality of cells for containing the plurality of articles; a temporary placement section having a temporary placement space on which at least one of the articles can be temporarily placed; a first detecting section configured to detect a position and posture of the article on the supplying section at a first time point, and detect an amount of movement of the supplying section; a second detecting section configured to detect a position and posture of the container on the discharging section at a second time point, and detect an amount of movement of the discharging section; a working machine configured to: take out the article by following the movement of the article on the supplying section, based on the position and posture of the article at the first time point and the amount of movement of the supplying section; place the taken out article on the temporary placement section; take out the article placed on the temporary placement section; and locate the article into the container by following the movement of the container on the discharging section, based on the position and posture of the container at the second time point and the amount of movement of the discharging section; and a controlling section configured to command the working machine to place the article from the supplying section to the temporary placement section, and, when the container is positioned within a container existence judgment region defined on the discharging section and when a predicted arrival time or distance until the article conveyed by the supplying section reaches a motion range of the working machine is larger than a predetermined value, command the working machine to locate the article from the temporary placement section into the container positioned on the discharging section.

In this aspect, a start point and an end point of the container existence judgment region may be set at respective positions which are separated from the motion range of the working machine on the discharging section by respective predetermined distances in an upstream direction.

In a preferred embodiment, the controlling section is configured to, when a predetermined period of time has elapsed after the article is placed on the temporary placement section, command the working machine to discard the article on the temporary placement section.

In a preferred embodiment, the temporary placement section includes a plurality of temporary placement spaces, and the controlling section is configured to switch the temporary placement space to be used from one to the other, when the number of the articles placed on the temporary placement space in use has reached a predetermined maximum number of capacity.

In a preferred embodiment, the controlling section is configured to command the working machine to take out the articles placed on the temporary placement section either in ascending order by time or in descending order by time, with respect to an elapsed time from when each article is placed on the temporary placement section.

BRIEF DESCRIPTION OF THE DRAWINGS

The above and other objects, features and advantages of the present invention will be made more apparent by the following description, of the preferred embodiments thereof, with reference to the accompanying drawings wherein.

DETAILED DESCRIPTIONS

Working Example 1

Figure 1:
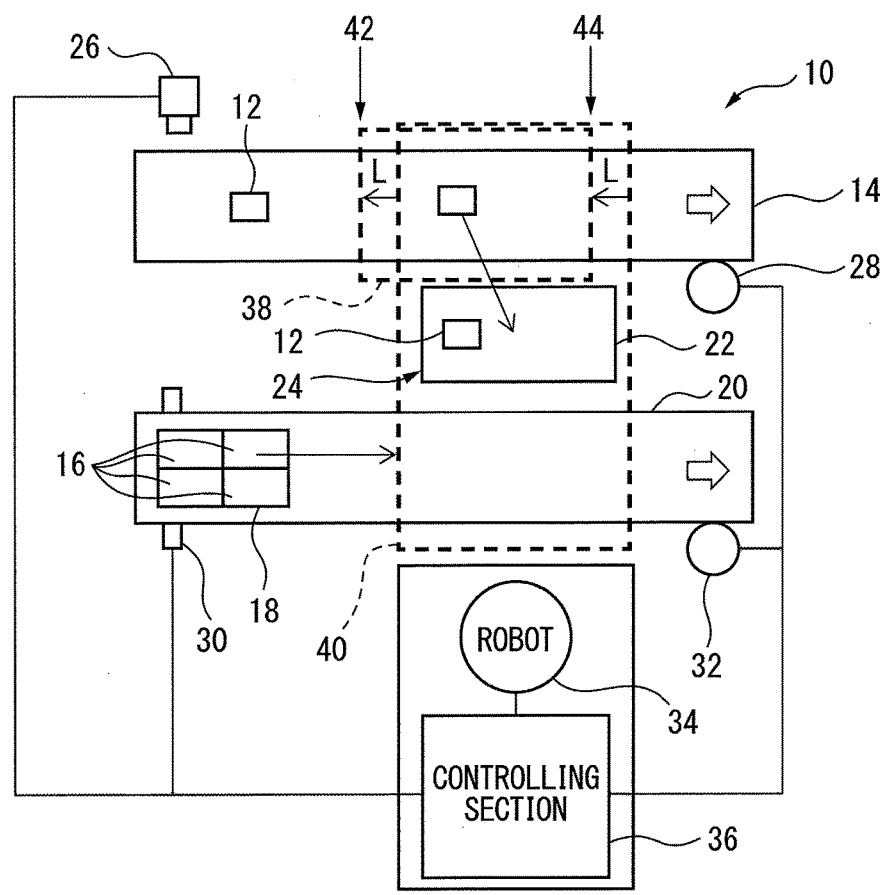
FIG. 1 shows a first working example of an article conveying device according to the present invention.

FIG. 1 shows an example of a configuration of an article conveying device according to the present invention, and also shows a first working example (working example 1) of the article conveying device. Article conveying device 10 has: a supplying section (e.g., a supply conveyor) 14 configured to sequentially convey or supply a plurality of articles 12 (in many cases, each having the same shape and dimension) such as machined parts or food items; a discharging section (e.g., a discharge conveyor) 20 configured to sequentially convey a plurality of containers 18 each having a plurality of cells 16 for containing articles 12; a temporary placement section 24 having a temporary placement space (e.g., a temporary placement table) 22 on which at least one of articles 12 can be temporarily placed; a first detecting section 26, 28 configured to detect a position and posture (position/posture) of article 12 on supplying section 14 at a determined first time point, and successively detect an amount of movement (feed) of supplying section 14; a second detecting section 30, 32 configured to detect a position and posture (position/posture) of container 18 on discharging section 20 at a determined second time point, and successively detect an amount of movement (feed) of discharging section 20. Herein, the term "position/posture" may mean both the position and the posture (orientation) of the article or the container, etc.

Article conveying device 10 also has a working machine 34, such as a robot, configured to: take out article 12 on supplying section 14; place article 12 taken out from supplying section 14 onto temporary placement section 24; take out article 12 placed on temporary placement section 24; and locate article 12 taken out from temporary placement section 24 or supply conveyor 14 into container 18. Further, article conveying device 10 has a controlling section 36, such as a robot controller or a personal computer, configured to control working machine 34 so that working machine 34 performs either of the above operations or motions based on a predetermined condition.

In the example of FIG. 1, the first detecting section has: a vision sensor (e.g., a camera) 26 positioned above supply conveyor 14 and configured to capture article 12 on supply conveyor 14; and an encoder 28 provided to supply conveyor 14 and configured to detect the amount of movement (or the feed position) of conveyor 14. Captured data of camera 26 and a detected value of encoder 28 may be transmitted to controlling section 36. Controlling section 36 may incorporate an image processor and an arithmetic processing unit, and can successively calculate the position/posture of each article 12 on supply conveyor 14 based on the information from camera 26 and encoder 28.

The second detecting section has: a phototube 30 provided to discharge conveyor 20 and configured to detect the position/posture of container 18 on discharge conveyor 20; and an encoder 32 provided to discharge conveyor 20 and configured to detect the amount of movement (or the feed position) of conveyor 20. Detected data of phototube 30 and a detected value of encoder 32 may be transmitted to controlling section 36. Controlling section 36 can successively calculate the position/posture of each container 18 on discharge conveyor 20 based on the information from phototube 30 and encoder 32.

It is not necessary to incorporate the image processor into controlling section 36, and thus the image processor may be a device separated from controlling section 36. Each of camera 26, phototube 30, encoders 28 and 32 may be arranged at any position as long as they can detect the data to be obtained, and thus the positions of them are not limited as shown in the drawings. Further, although the flow directions (from left to right) of supply conveyor 14 and discharge conveyor 20 are parallel to each other and temporary placement section 24 is positioned between the conveyors in the example of FIG. 1, the present invention is not limited as such. In other words, each of the conveyors and the temporary placement section may have any constitution and may be located at any position, as long as the effect of the invention can be obtained.

For example, working machine 34 is a robot such as a multi-joint robot having six axes, and is configured to: take out article 12 by following the movement of article 12 on supply conveyor 14, based on the position/posture of article 12 at the first time point detected by the first detecting section and the amount of movement of the supply conveyor 14 at the present time; place article 12 taken out from supply conveyor 14 onto temporary placement section 24; take out article 12 placed on temporary placement section 24; and locate article 12 into container 18 by following the movement of container 18 (containing cell 16) on discharge conveyor 20, based on the position/posture of container 18 at the second time point detected by the second detecting section and the amount of movement of discharge conveyor 20 at the present time. Although working machine 34 is one robot in FIG. 1, plural robots may be used as working machine 34.

Figure 2:
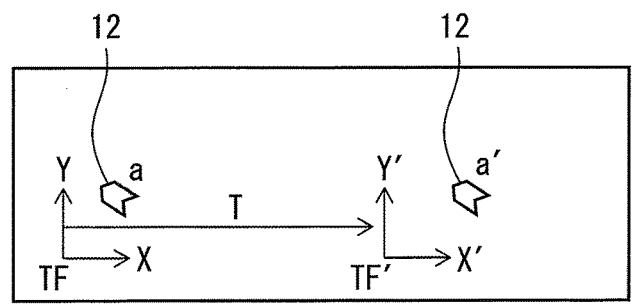
FIG. 2 is a view explaining an example of a following motion of a robot.

FIG. 2 is a view explaining an example of the following motion as described above. In FIG. 2, "TF" represents a tracking coordinate system, and "TF'" represents a coordinate system obtained by multiplying tracking coordinate system by an amount of rotation. In this case, the relationship between coordinate systems TF and TF' can be represented by following equation (1), in which "T" represents a coordinate conversion matrix. In this regard, a component of translational movement can be represented as "(e2−e1)/Scale," wherein "e1" is a (past) encoder count value when article 12 is detected, "e2" is a present encoder count value, and "Scale" (count/mm) is a value representing a relationship between the encoder count value and the amount of movement of the conveyor.

$$TF'=T \cdot TF \qquad (1)$$

In FIG. 2, "a" represents the position/posture of article 12 when the article is detected viewed in coordinate system TF, and "a'" represents the position/posture of article 12 at the present time viewed in coordinate system TF'. Robot 34 can take out article 12 by following article 12 (or by performing following motion with respect to article 12), with reference to coordinate system TF'.

Figure 3:
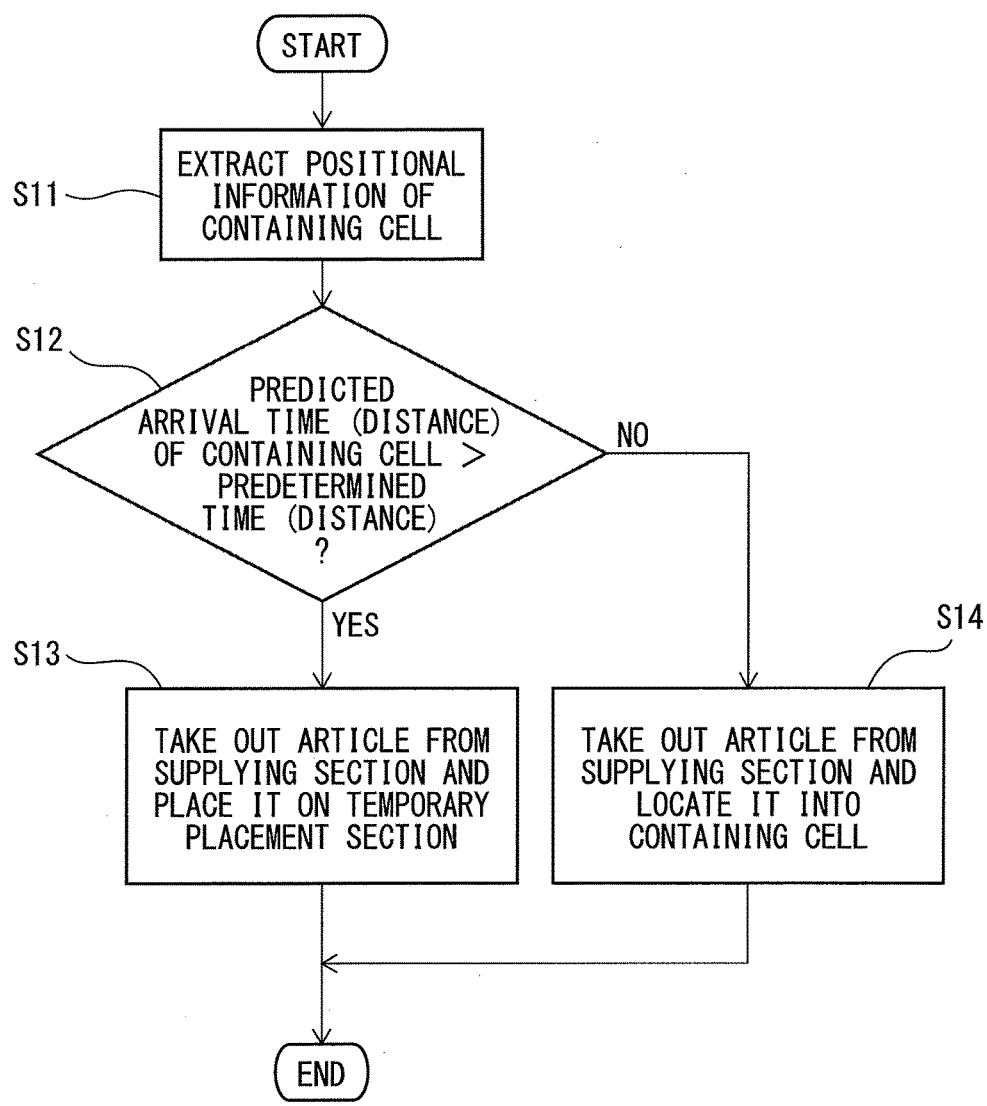
FIG. 3 is a flowchart exemplifying a procedure in the first working example.

FIG. 3 is a flowchart exemplifying a procedure in the article conveying device (in particular, controlling section 36) according to working example 1. When temporary placement section 24 has a space where at least one article 12 can be placed, when article 12 on supply conveyor 14 is positioned within an article existence judgment region 38, and when container 18 does not exist in a motion range 40 (or a range of motion) of working machine 34, controlling section 36 extracts positional information of container 18 positioned at an upstream side relative to range motion 40 with respect to the flow direction of discharge conveyor 20 (step S11). Next, controlling section 36 compares a predicted arrival time or distance until container 18 conveyed by discharge conveyor 20 reaches (enters) motion range 40 to a predetermined value (or a predetermined time or distance (step S12). Then, when the predicted arrival time or distance is larger than the predetermined value, controlling section 36 transmits a command to working machine 34 so that working machine 34 takes out article 12 from supply conveyor 14 and places it onto temporary placement section 24 (step S13). Article 12 placed onto temporary placement section 24 is conveyed to container 18 by robot 34, when the container is positioned within motion range 40.

On the other hand, when the predicted arrival time or distance is equal to or smaller than the predetermined value, controlling section 36 transmits a command to working machine 34 so that working machine 34 takes out article 12 from supply conveyor 14 and places it into container 18, without placing it onto temporary placement section 24, after container 18 (containing cell 16) enters motion range 40 (step S14).

As shown in FIG. 1, it is preferable that article existence judgment region 38 be defined so as to be separated from motion range 40 on supply conveyor 14 toward the upstream side by a predetermined distance with respect to the conveying direction of supply conveyor 14, in view of a movement time and a movement distance from when a movable part (e.g., a robot hand) of working machine 34 is activated to when the movable part reaches (article 12 positioned on) supply conveyor 14. For example, a distance L between a boundary of motion range 40 and each of a start point 42 and an end point 44 (with respect to the flow direction of supply conveyor 14) of article existence judgment region 38 can be represented by following equation (2), wherein "A" is an average velocity of supply conveyor 14, "B" and "C" are a motion velocity and a maximum movement distance of robot 34, respectively.

$$L=A \times C/B \qquad (2)$$

In working example 1, it can be automatically judged as to whether article 12 should be temporarily placed onto temporary placement section 24, in view of the predicted time or distance until container 18 enters motion range 40 (i.e., until robot 34 is capable of locating article 12 into the container). Therefore, even when articles 12 are excessively supplied by supply conveyor 14, the article conveying device can stably convey (a constant amount of) articles without overflowing the articles, by temporarily placing one or more article 12 onto temporary placement section 24.

In addition, the first time point and the second time point may be the same to each other or different from each other, and the same is also applicable to the following working examples.

Working Example 2

Figure 4:
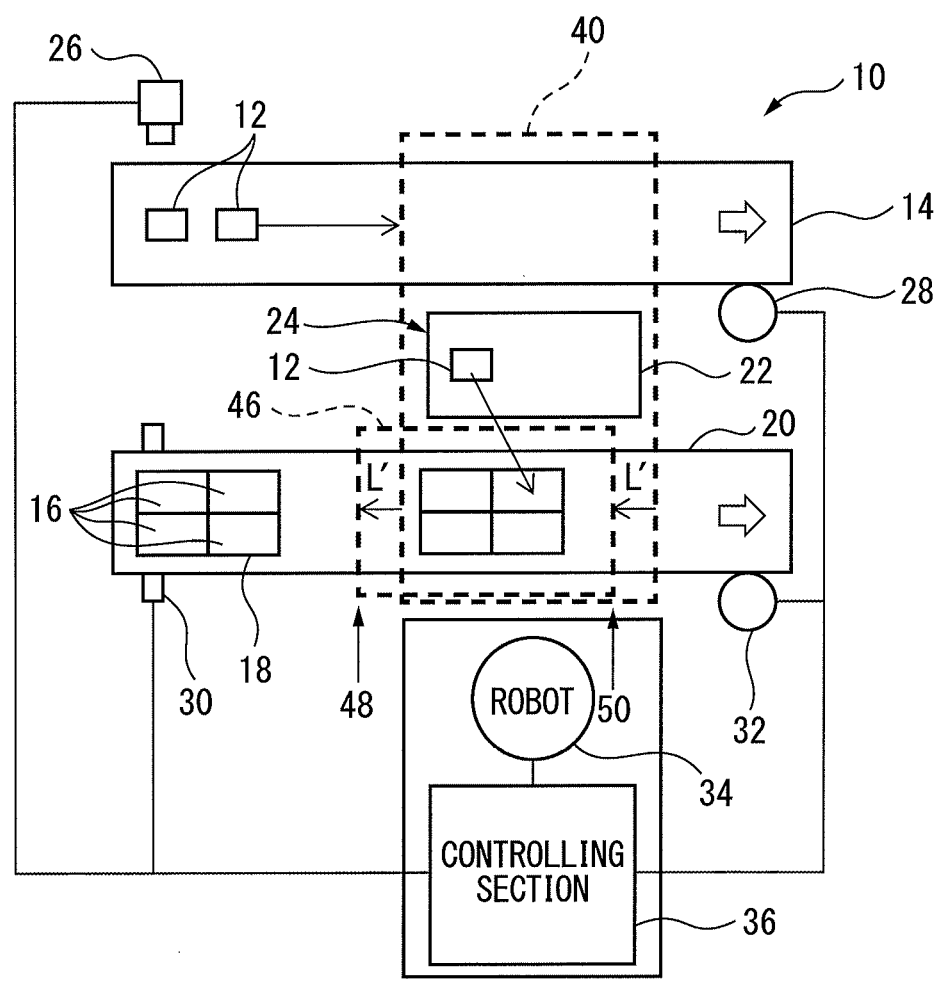
FIG. 4 shows a second working example of the article conveying device according to the present invention.

FIG. 4 shows a second working example (working example 2) of the article conveying device according to the present invention. In working example 2, only a subject matter different from working example 1 will be explained, and therefore, the same reference numerals are added to the components of working example 2 corresponding to the components of working example 1, and detailed explanations thereof will be omitted.

Figure 5:
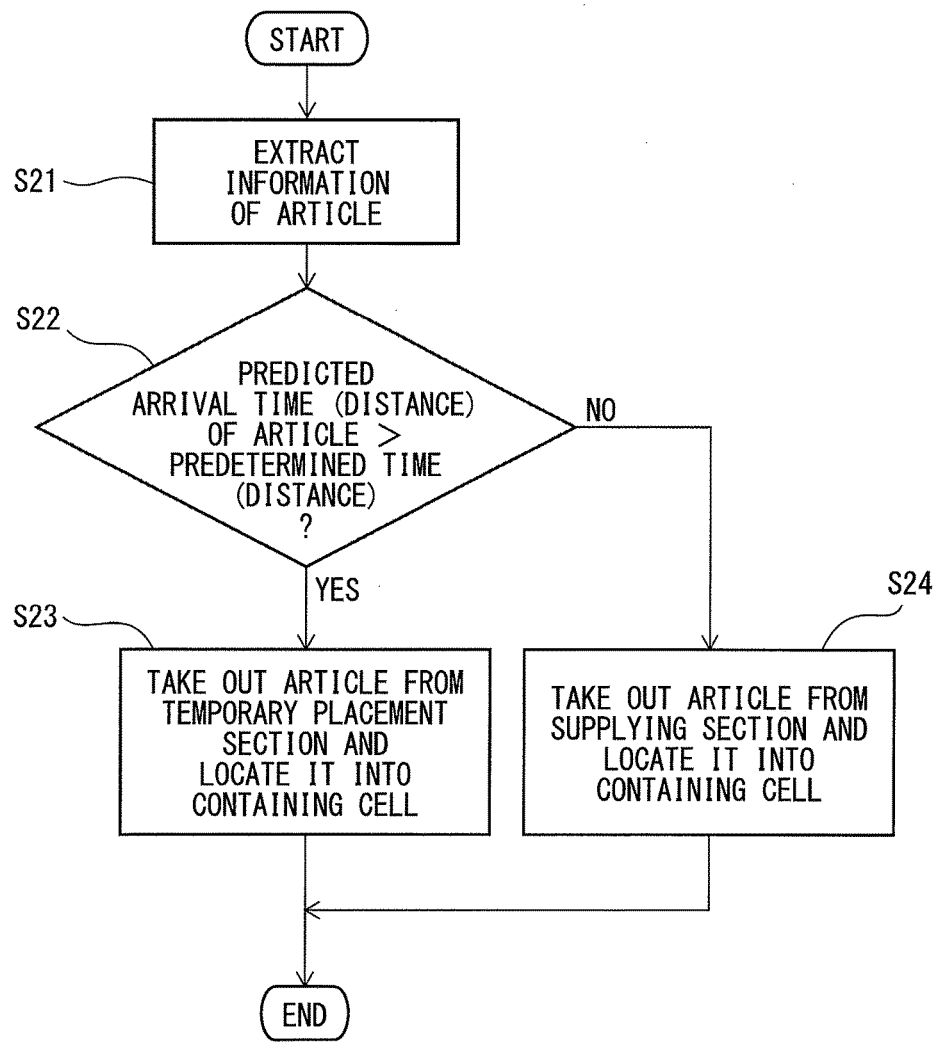
FIG. 5 is a flowchart exemplifying a procedure in the second working example.

FIG. 5 is a flowchart exemplifying a procedure in the article conveying device (in particular, controlling section 36) according to working example 2. When container 18 on discharge conveyor 20 is positioned within a container existence judgment region 46, and when at least one article 12 exists on temporary placement section 24, controlling section 36 extracts positional information of article 12 positioned at an upstream side relative to range motion 40 with respect to the flow direction of supply conveyor 14 (step S21). Next, controlling section 36 compares a predicted arrival time or distance until article 12 conveyed by supply conveyor 14 reaches (enters) motion range 40 to a predetermined value (or a predetermined time or distance (step S22). Then, when the predicted arrival time or distance is larger than the predetermined value, controlling section 36 transmits a command to working machine 34 so that working machine 34 takes out article 12 from temporary placement section 24 and locate it into container 18 (or containing cell 16) (step S23).

On the other hand, when the predicted arrival time or distance is equal to or smaller than the predetermined value, controlling section 36 transmits a command to working machine 34 so that working machine 34 takes out article 12 from supply conveyor 14 and places it into container 18, without placing it onto temporary placement section 24, after container 18 (containing cell 16) enters motion range 40 (step S24).

As shown in FIG. 4, it is preferable that container existence judgment region 46 be defined so as to be separated from motion range 40 on discharge conveyor 20 toward the upstream side by a predetermined distance with respect to the conveying direction of discharge conveyor 20, in view of a movement time and a movement distance from when the movable part (e.g., the robot hand) of working machine 34 is activated to when the movable part reaches container 18 after gripping article 12 on temporary placement section 24. For example, a distance L' between the boundary of motion range 40 and each of a start point 48 and an end point 50 (with respect to the flow direction of discharge conveyor 20) of container existence judgment region 46 can be represented by following equation (3), wherein "A'" is an average velocity of discharge conveyor 20, "B'" and "C'" are a motion velocity and a maximum movement distance of robot 34, respectively.

$$L'=A'\times C'/B' \tag{3}$$

In working example 2, in case that robot 34 must wait for a certain period of time until article 12 enters motion range 40 (i.e., until robot 34 is capable of taking out article 12 from supply conveyor 14), article 12 temporarily placed on temporary placement section 24 can be automatically moved or located into container 18. Therefore, even when articles 12 are insufficiently supplied by supply conveyor 14 relative to the capacity of container 18, the article conveying device can stably convey (a constant amount of) articles.

Working Example 3

In a third working example (working example 3) of the present invention, an elapsed time from when each article 12 is placed onto temporary placement section 24 as shown in FIG. 1 or 4 is measured by using a timer, etc. For example, such a timer may be incorporated in controlling section 36. Then, when a predetermined period of time has elapsed after the article is placed on temporary placement section 24, controlling section 36 transmits a command to robot 34 so that robot 34 discards the corresponding article without moving it into container 18.

As described above, in working example 3, when the article is a perishable food, etc., the bad article can be prevented from being contained into the container and shipped, by discarding the article after the predetermined period of time has elapsed.

Working Example 4

Figure 6:
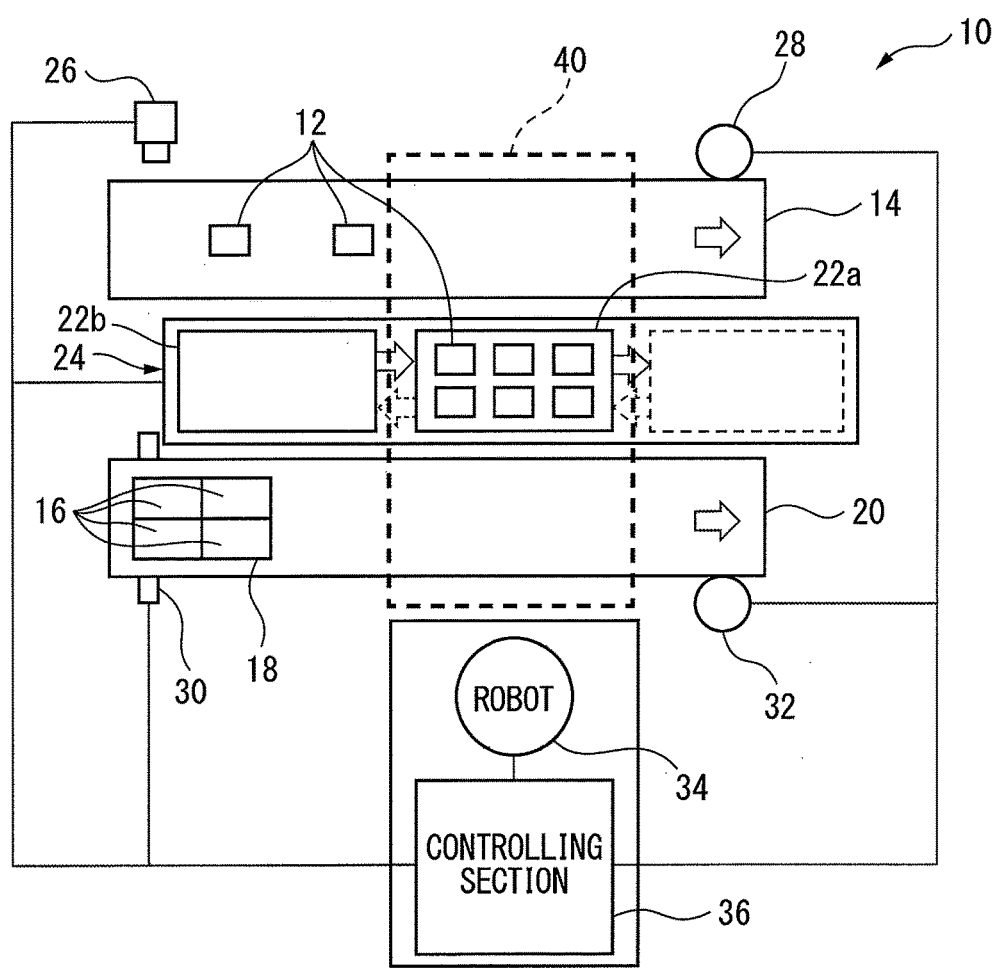
FIG. 6 shows a fourth working example of the article conveying device according to the present invention.

FIG. 6 shows a fourth working example (working example 4) of the article conveying device according to the present invention. In working example 4, only a subject matter different from working example 1 will be explained, and therefore, the same reference numerals are added to the components of working example 4 corresponding to the components of working example 1, and detailed explanations thereof will be omitted.

As shown in FIG. 6, in working example 4, temporary placement section 24 includes a plurality of (in the illustrated example, two) temporary placement spaces (tables), concretely, a first temporary placement table 22a positioned within motion range 40 of robot 34, and a second temporary placement table 22b positioned outside motion range 40 of robot 34. Each of temporary placement tables can be moved into or out of motion range 40, by using a driving section such as a traveling axis (not shown). Therefore, first temporary placement table 22a can be moved out of motion range 40, and simultaneously, second temporary placement table 22b can be moved into motion range 40, or vice versa.

With respect to the procedure in working example 1 or 2, when the number of articles placed on first temporary placement table 22a in use (i.e., positioned within motion range 40) reaches a predetermined maximum number of capacity (in this example, six), the temporary placement table to be used is switched from first temporary placement table 22a to second temporary placement table 22b. For example, after six articles 12 are placed on temporary placement table 22a within motion range 40, controlling section 36 transmits a (switching) command to the traveling axis so that the traveling axis moves first temporary placement table 22a out of motion range 40, and simultaneously, moves second temporary placement table 22b into motion range 40.

As described above, in working example 4, by alternately switching the plurality of temporary placement spaces, the considerable number of articles can be temporarily placed even if motion range 40 of working machine 34 is relatively small, and thus the article conveying device having high flexibility can be constituted.

Working Example 5

Figure 7:
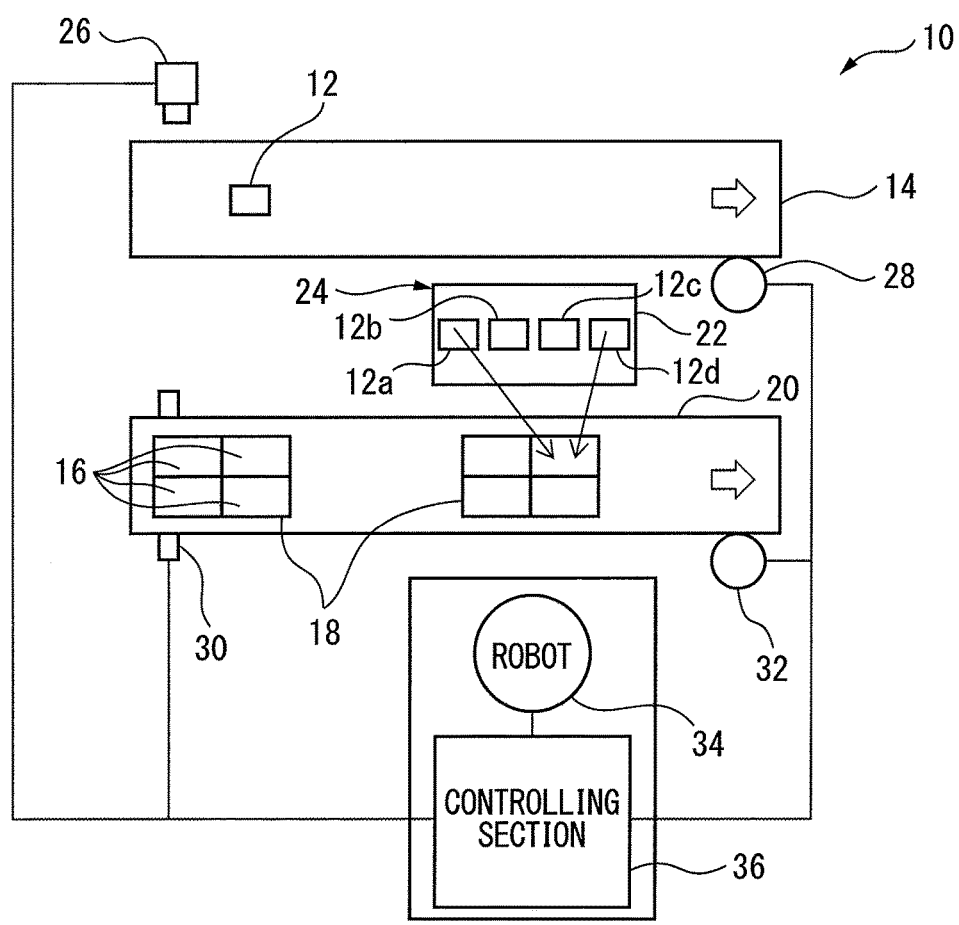
FIG. 7 shows a fifth working example of the article conveying device according to the present invention.

FIG. 7 shows a fifth working example (working example 5) of the article conveying device according to the present invention. In working example 5, only a subject matter different from working example 1 will be explained, and therefore, the same reference numerals are added to the components of working example 5 corresponding to the components of working example 1, and detailed explanations thereof will be omitted.

In working example 5, similarly to working example 3, an elapsed time from when each article 12 is placed onto temporary placement section 24 is measured by using a timer, etc., and such a timer may be incorporated in controlling section 36. Then, as shown in FIG. 7, in case that plural articles 12 are placed on temporary placement section 24, controlling section 36 may previously determine an order of conveyance of articles 12 by working machine 34 from temporary placement section 24 to containing cell 16 as either an ascending order by time (i.e., a descending order of the elapsed time from when the article is placed onto temporary placement section 24) or an descending order by time (i.e., an ascending order of the elapsed time from when the article is placed onto temporary placement section 24).

In the example of FIG. 7, four articles 12a to 12d are positioned on temporary placement section 24, and the descending order of the elapsed time from when each article is placed onto temporary placement section 24 is represented by (12a→12b→12c→12d) (i.e., the elapsed time of article 12a is the longest). In this case, when it is determined that the articles should be taken out in the ascending order by time, the articles will be conveyed into container 18 in the order represented by (12a→12b→12c→12d). On the other hand, when it is determined that the articles should be taken out in the descending order by time, the articles will be conveyed into container 18 in the order represented by (12d→12c→12b→12a). When the article is a perishable food, etc., the probability of putrefaction of the article can be minimized, by taking out the articles in the ascending order by time. On the other hand, when the articles are machined parts stacked on the temporary placement space, etc., the articles can be smoothly taken out in a top-to-bottom order, by taking out the articles in the descending order by time. As such, the versatility of the article conveying device can be improved, in which the order of taking out the article can be selected (the ascending order or descending order by time).

According to the article conveying device of the present disclosure, it can be automatically judged as to whether or not the article should be temporarily placed onto the temporary placement section, in view of the predicted arrival time or distance of the container with respect to the motion range of the working machine, and/or, it can be automatically judged as to whether the article should be conveyed from the supplying section or the temporarily placement section, in view of the predicted arrival time or distance of the article with respect to the motion range of the working machine. Therefore, even when the articles are excessively or insufficiently supplied relative to the capacity of the container, the article conveying device can stably product and convey a constant amount of articles.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An article conveying device comprising:
    a supplying section configured to convey a plurality of articles;
    a discharging section configured to convey a plurality of containers each having a plurality of cells for containing the plurality of articles;
    a temporary placement section having a temporary placement space on which at least one of the articles can be temporarily placed;
    a first detecting section configured to detect a position and posture of the article on the supplying section at a first time point, and detect an amount of movement of the supplying section;
    a second detecting section configured to detect a position and posture of the container on the discharging section at a second time point, and detect an amount of movement of the discharging section;
    a working machine configured to: take out the article by following the movement of the article on the supplying section, based on the position and posture of the article at the first time point and the amount of movement of the supplying section; place the taken out article on the temporary placement section; take out the article placed on the temporary placement section; and locate the article into the container by following the movement of the container on the discharging section, based on the position and posture of the container at the second time point and the amount of movement of the discharging section; and
    a controlling section configured to:
        compare a predicted arrival time indicating when the container conveyed by the discharging section reaches a motion range of the working machine to a time threshold, or compare a predicted distance indicating when the container conveyed by the discharging section reaches the motion range of the working machine to a distance threshold, and
        when the article is positioned within an article existence judgment region defined on the supplying section and when a predicted arrival time is larger than the time threshold or the predicted distance is larger than the distance threshold, command the working machine to place the article from the supplying section to the temporary placement section, and command the working machine to locate the article from the temporary placement section into the container which has reached the motion range.

2. The article conveying device as set forth in claim 1, wherein a start point and an end point of the article existence judgment region are set a respective positions which are separated from the motion range of the working machine on the supplying section by respective predetermined distances in an upstream direction.

3. The article conveying device as set forth in claim 1, wherein the controlling section is configured to, when a predetermined period of time has elapsed after the article is placed on the temporary placement section, command the working machine to discard the article on the temporary placement section.

4. The article conveying device as set forth in claim 1, wherein the temporary placement section includes a plurality of temporary placement spaces, and wherein the controlling section is configured to switch the temporary placement space to be used from one to the other, when the number of the articles placed on the temporary placement space in use has reached a predetermined maximum number of capacity.

5. The article conveying device as set forth in claim 1, wherein the controlling section is configured to command the working machine to take out the articles placed on the temporary placement section either in ascending order by time or in descending order by time, with respect to an elapsed time from when each article is placed on the temporary placement section.

6. An article conveying device comprising:
    a supplying section configured to convey a plurality of articles;
    a discharging section configured to convey a plurality of containers each having a plurality of cells for containing the plurality of articles;
    a temporary placement section having a temporary placement space on which at least one of the articles can be temporarily placed;
    a first detecting section configured to detect a position and posture of the article on the supplying section at a first time point, and detect an amount of movement of the supplying section;
    a second detecting section configured to detect a position and posture of the container on the discharging section at a second time point, and detect an amount of movement of the discharging section;
    a working machine configured to:
        take out the article by following the movement of the article on the supplying section, based on the position and posture of the article at the first time point and the amount of movement of the supplying section;
        place the taken out article on the temporary placement section; take out the article placed on the temporary placement section; and
        locate the article into the container by following the movement of the container on the discharging section, based on the position and posture of the container at the second time point and the amount of movement of the discharging section; and
    a controlling section configured to:
        compare a predicted arrival time indicating when the article conveyed by the supplying section reaches a motion range of the working machine to a time threshold, or compare a predicted distance indicating when the article conveyed by the supplying section reaches the motion range of the working machine to a distance threshold, and
        command the working machine to place the article from the supplying section to the temporary placement section, and, when the container is positioned within a container existence judgment region defined on the discharging section and when a predicted arrival time is larger than the time threshold or the predicted distance is larger than the distance threshold, command the working machine to locate the article from the temporary placement section into the container positioned on the discharging section.

7. The article conveying device as set forth in claim 6, wherein a start point and an end point of the container existence judgment region are set at respective positions which are separated from the motion range of the working machine on the discharging section by respective predetermined distances in an upstream direction.

* * * * *